UNITED STATES PATENT OFFICE.

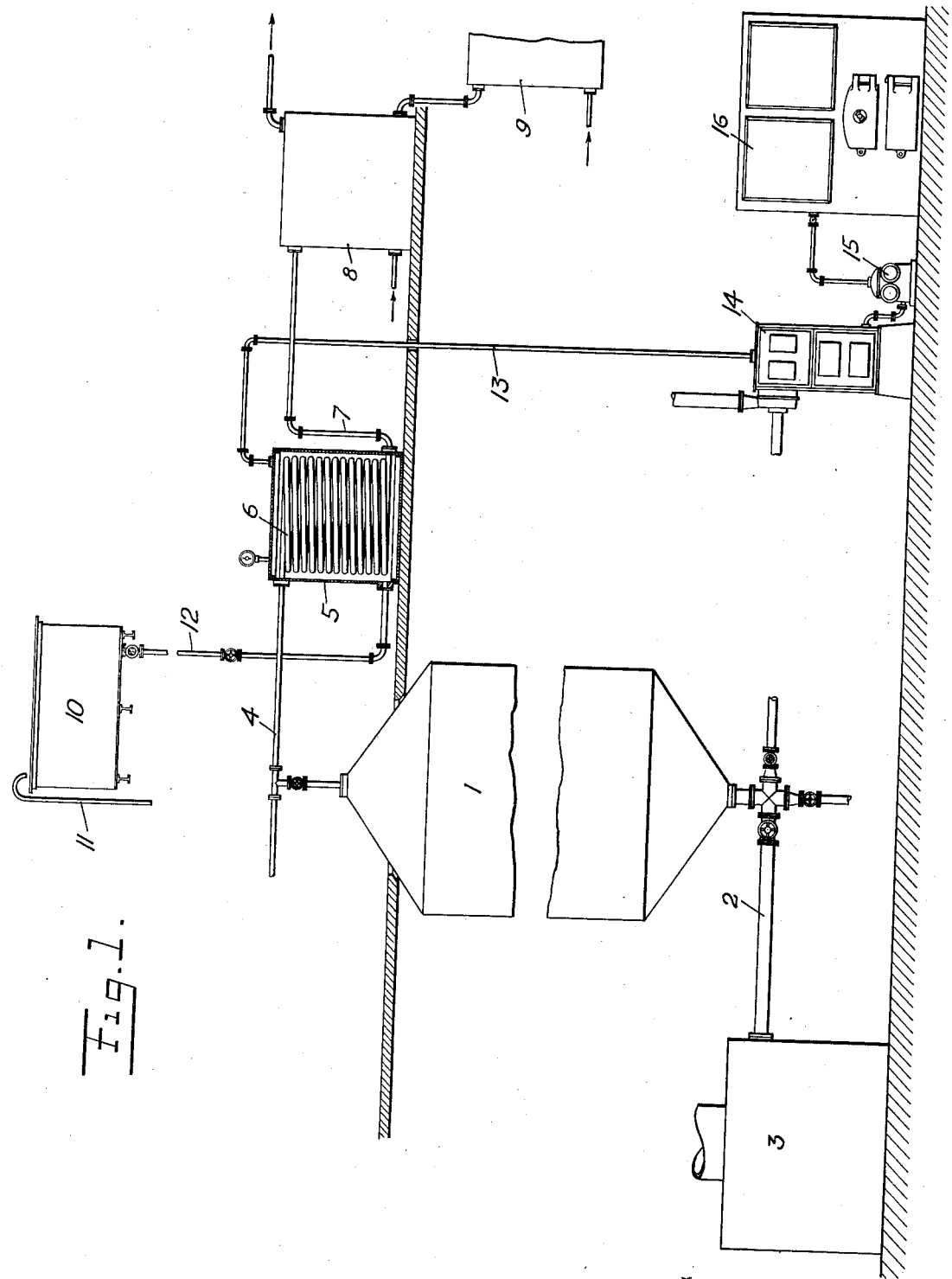

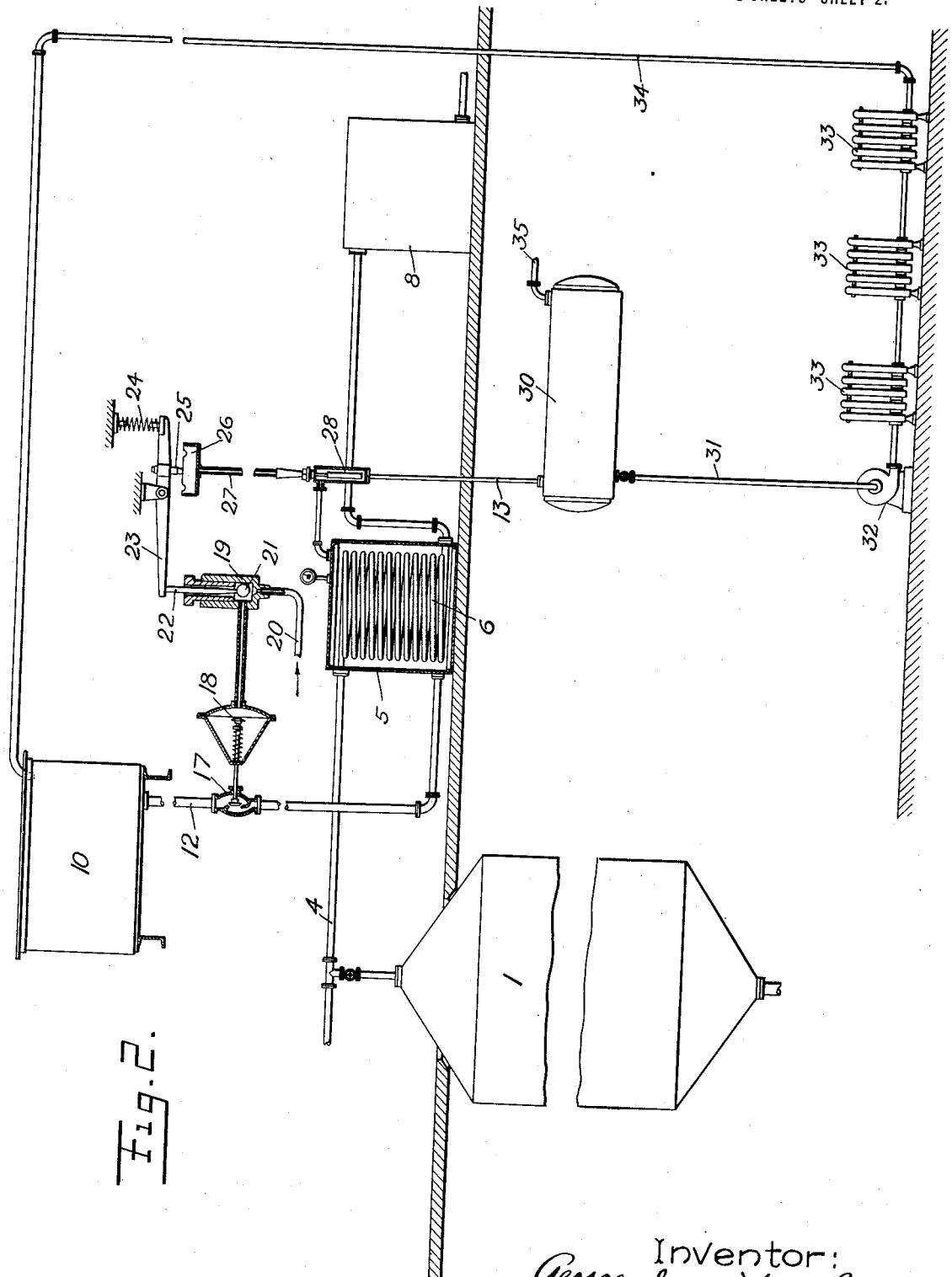

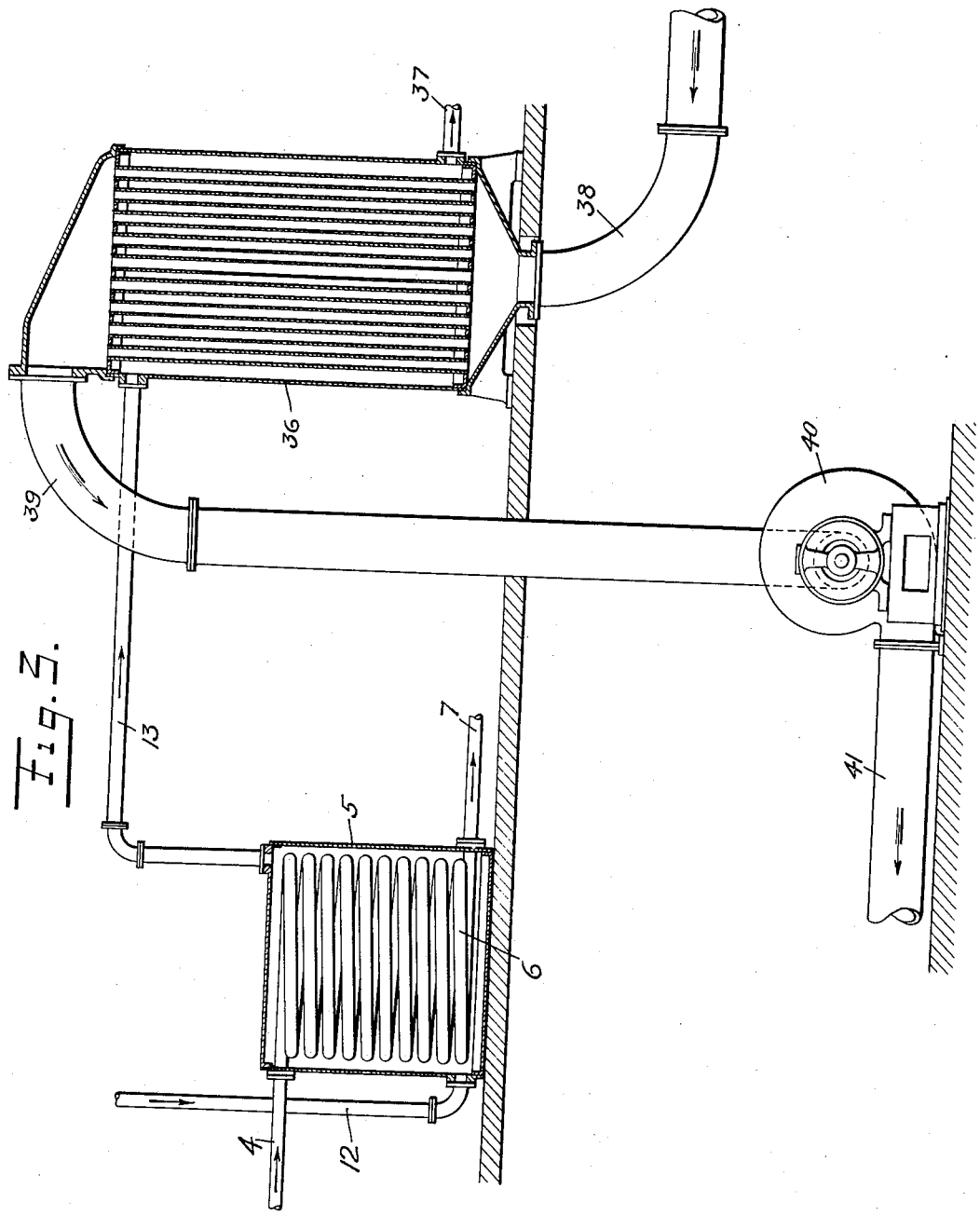

GEORGE S. WITHAM, JR., OF HUDSON FALLS, NEW YORK.

HEAT-RECLAIMING SYSTEM FOR PULP-MILLS.

1,384,796.      Specification of Letters Patent.     Patented July 19, 1921.

Application filed July 15, 1916. Serial No. 109,456.

*To all whom it may concern:*

Be it known that I, GEORGE S. WITHAM, Jr., a citizen of the United States, residing at and whose post-office address is 9 Mechanic street, Hudson Falls, New York, have invented certain new and useful Improvements in Heat-Reclaiming Systems for Pulp-Mills; and I do hereby declare the following to be a full, clear, and exact description of the invention, such as will enable others skilled in the art to which it appertains to make and use the same.

This invention relates to the recovery and utilization of heat energy commonly wasted but available in considerable amount in paper pulp plants.

In the normal operation of pulp digesters it is common practice to introduce steam during the cook and to regulate the conditions of temperature and pressure within the digester from time to time, or even continuously during part of the operation. When a battery of digesters is connected to a common relief line, usually one or more of the digesters is discharging continually.

The discharge or relief from the digesters is made up of appreciable amounts of sulfur dioxid mixed with water vapor. The sulfur dioxid is of value and is usually recovered for re-use by condensation or absorption. In order to condense the gas it is necessary to cool it as much as possible in order that the maximum recovery and condensation may take place. It is accordingly the common practice to subject the relief gases containing the sulfur dioxid to the cooling action of large volumes of water so that the gases will be cooled practically to the temperature of the cooling water and the maximum cooling effect thereby obtained.

According to the present invention, advantage is taken of the heat energy available in the relief gases in a novel and particularly valuable manner. These gases escape from the digester or digesters at a high temperature. When, however, these gases are subjected to the cooling action of large volumes of water as in the common practice, this heat energy is dissipated throughout the large volume of water and lost for all practical purposes, inasmuch as the water is commonly discharged directly to the sewer.

According to the present invention, I provide a heat recovery apparatus arranged to be subjected to the heating action of the highly heated relief gases from the digesters, and I so control and regulate this heating action that it is available for use for industrial purposes, such as for heating the paper mill or other buildings, or for preheating boiler feed water, etc.

By bringing the highly heated relief gases into contact with a relatively small body or stream of water, properly regulated, I have found that it is possible to preheat the water to a high temperature, approaching that of the highly heated gases themselves, while the gases in turn will be correspondingly cooled. The action is accordingly of value and of advantage both for the purpose of heating the water and for assisting in the cooling of the gases. Subsequently, the gases are further cooled to secure their maximum condensation or recovery.

The highly heated water obtained in this manner is available for use directly in hot water heating systems, or indirectly as the heating agent for heating air or other water to be used in turn for heating purposes. The highly heated water can also be used to advantage for boiler feed purposes.

The invention further contemplates the automatic regulation of the heating action secured by the relief gases so that the supply of water can be furnished at a uniform or regulated temperature, and so that the volume of water thus heated will be regulated automatically by the heating effect available in the relief gases for effecting the heating action.

Inasmuch as the relief gases contain sulfur dioxid in considerable amount, it is important that the water heated by the action of the gases be prevented from contamination and acidulation by escape of relief gases into the water being heated. According to the present invention, I provide against possible escape of the gases into the liquid by subjecting the liquid to a pressure in excess of that of the gases so that, if there is any leak in the apparatus, water will leak into the relief gases from the liquid being heated, rather than permitting leakage in the reverse direction. This pressure will, of course, vary with the pressure of the relief gases, and it may be obtained by maintaining a sufficient head of liquid to exert a pressure greater than that of the gases, or by using a pump or other means for securing the desired pressure.

The invention will be described more in detail in connection with the accompanying drawings illustrative thereof, in which,—

Figure 1 shows more or less diagrammatically an arrangement of apparatus embodying the invention;

Fig. 2 shows a modified arrangement of apparatus; and

Fig. 3 shows a still further modification.

In Fig. 1, one of the battery of digesters is indicated at 1, this digester connecting by the usual connection 2, with the blow pit 3. The relief line from this digester, and from other digesters where a plurality are used, is indicated at 4. This relief pipe as above pointed out contains the highly heated relief gases escaping from the digester and the temperature of the pipe is accordingly substantially that of the highly heated escaping gases. In order to utilize this heat, I provide a heat recovering apparatus 5 which may be of any suitable construction but which is shown as a closed tank or receptacle containing therein the coil 6 through which the hot gases pass from the pipe 4. These gases then pass through the pipe 7 to further coolers 8 and 9, where they are cooled to the desired temperature for effecting as complete a recovery as possible. The coolers 8 and 9, are indicated in diagram only and their construction may take different forms, including the form of absorption tanks or towers, the further condensation or cooling of the gases being capable of various embodiments.

The tank or receptacle 5 is supplied with water from the tank 10 through the supply pipe 12, the tank 10 in turn being supplied from any suitable source through the pipe 11. The tank 10 is arranged a sufficient distance above the tank 5 so that the pressure of the liquid within the tank 5, due to the head of liquid, will be greater than the pressure of the relief gases within the coil 6 so that any leakage through the walls of the pipe 6 will take place from outside in, rather than of the gases from the inside out. The water being heated, is thus insured against acidulation or contamination, and the apparatus in which the water is used is correspondingly protected. This is of particular importance where this water is to be used in boilers or even in heating systems where the highly heated water comes in contact with metal which would be corroded by the acid with which the water might be contaminated.

From the heat recovery tank 5 the highly heated water is shown in Fig. 1 as passing through the pipe 13 to the preheater 14 from which the preheated water is pumped by the pump 15 to the boiler 16. In the preheater 14 the water can be further heated by exhaust or live steam or in other manner. The pipe 12 is provided with a regulating valve so that the flow of water through the heat recovery apparatus 5 can be regulated. Thus, when several digesters are in operation, a larger flow of water can be permitted and heated than when a single digester is in operation.

In order that the water may be heated to a uniformly high temperature, I provide automatic means controlled by the temperature of the heated water for regulating the supply of cold water through the pipe 12 to the heat recovery apparatus 5. Such an automatic regulator is shown in Fig. 2, the arrangement of parts of which correspond generally to those of Fig. 1. In this case, however, the outlet pipe 13 for the heated water has a thermostatic bulb therein arranged to be subjected to the heating action of the hot liquid. The regulation of the flow is effected by means of the automatic regulating valve 17 which is controlled by the thermostatic valve.

The particular construction of the regulating apparatus may take different forms but that illustrated in Fig. 2 is one which I have found in practice to be reliable and accurate. In this construction, the valve 17 is controlled by a pressure diaphragm regulator 18, which communicates with the casing 19 to which air under pressure is supplied through the pipe 20.

Within the casing 19 is the ball valve 21 arranged to be acted upon by the rod 22 which in turn is actuated by one end of the lever 23, the other end of which is yieldably held by a spring 24 and actuated at 25 by the vapor capsule 26 communicating through the pipe 27 with the vapor bulb 28. The vapor bulb is full of vapor under pressure and the variations in temperature of the bulb due to the variations in temperature of the water causes the vapor within the capsule 26 to expand or contract with resulting actuation of the lever 23, rod 22 and ball 21. If the temperature rises, the vapor will expand and the rod 22 will force the ball 21 against its seat, preventing inflow of air at 20. When the rod 22 is in intermediate position, the ball is held from its seat by the incoming air which escapes around the ball and around the rod 22 to the atmosphere, the diagram 18 being in this case subjected to atmospheric pressure. When the ball 21 is seated and the compressed air is shut off, the diaphragm also communicates with the atmosphere around the rod 22. When the rod 22 rises, due to contraction of the vapor and lowering of its temperature, the escape of the air around the rod 22 is shut off by the seating of the ball against the upper seat, and the compressed air from the pipe 20 then acts against the diaphragm 18 forcing the valve 17 to its seat. The arrangement is accordingly such that the flow of water past the valve 17 is regulated by the temperature of the water passing the vapor or thermostatic bulb 28. In this way the temperature of the water is maintained approximately constant and the flow is increased or decreased with the increase or decrease in the relief vapors passing through the coil 6, as will be readily understood.

In the arrangement of Fig. 2 also, the tank 10 is maintained a sufficient distance above the tank 5, or the valve 17 is maintained a sufficient distance above the apparatus 5 so that the pressure of the water within the apparatus 5 is maintained greater than the pressure of the relief gases passing through the coil 6, for reasons above specified.

In the arrangement of Fig. 2, the highly heated water passes through the pipe 13 to a tank 30 from which the water is circulated by the pipe 31 and the pump 32, through the heating system 33 and thence back through the pipe 34 to the storage tank 10. By means of the pipe 35, the highly heated water may be drawn off for other purposes and cold water instead, supplied from the tank 10. The arrangement of heating apparatus of Fig. 2 is intended to be diagrammatic and illustrative of one suitable tank of hot water heating system for utilizing the highly heated water for heating purposes. It will be understood that this highly heated water is available for use in hot water systems of different kinds such as are common in the hot water heating art.

Fig. 3 shows a further application of the invention, and the automatic regulating elements for maintaining a constant temperature of the water being heated or omitted from this figure also, as well as Fig. 1. In Fig. 3, the hot water pipe 13 leads to a heat interchanger or air preheater 36, where it gives up its heat to the air passing therethrough, after which the cooled water escapes at 37 back to the storage tank or to other places of use or discharge. The air to be heated enters at 38 and comes in intimate contact with the heated water after which the hot air is circulated by the pump 40 through the pipes 39 and 41 to its desired place of use. The arrangement of Fig. 3 also is stated to be illustrative of a heating system in which the highly heated water is utilized indirectly for heating air or other fluid which is the direct heating agent.

It will accordingly be seen that the present invention provides for the recovery and industrial utilization of considerable amounts of waste heat which is available for use at a high temperature and without interfering with the normal operation of the recovery of sulfur dioxid from the relief gases of paper pulp digesters. The recovery of the sulfur dioxid is rather promoted by the cooling action of the water which is thus being heated.

As distinguished from the usual recovery systems in which the sulfur dioxid is recovered by the use of large amounts of water heated to a small extent, the present invention includes the recovery of a considerable portion of this waste heat in the form of water heated to a high temperature which is available for use at such high temperature for industrial purposes.

I am aware that it has been proposed to recover waste heat from the gases escaping from the blow pit of a pulp digester, but the material discharged into the blow pit contains only such available heat as is present in the various portions thereof which are so utilized; whereas, according to the present invention, the direct heating action of the relief vapors is obtained during the whole of the cook, this recovery being accordingly of a continuous nature, and being the recovery of heat energy normally wasted, and lost in the usual pulp-making operation.

I claim:—

1. A heat reclaiming system for pulp mills comprising one or more digesters provided with means for relieving gases therefrom during the digestion, means for bringing a regulable stream of liquid to be heated into heat interchanging relation with said gases while still at a high temperature, and automatic regulating means for regulating said stream of liquid in accordance with the temperature of the heated liquid; substantially as described.

2. A heat reclaiming system for pulp mills comprising one or more digesters provided with means for relieving gases therefrom during the digestion, means for cooling such gases and for recovering the sulfur dioxid therefrom, means for bringing a regulable stream of liquid to be heated into heat interchanging relation with said gases while still at a high temperature and before the recovery of such sulfur dioxid, and automatic means for regulating said stream of liquid in accordance with the heat imparted thereto; substantially as described.

3. A heat reclaiming system for pulp mills, comprising one or more digesters provided with means for relieving gases therefrom during the digestion, means for bringing a regulable stream of liquid to be heated into heat interchanging relation with said gases while still at a high temperature, thermostatically operated means arranged in heat interchanging relation with the heated liquid, and means actuated by said thermostatically operated means for regulating such stream of liquid, whereby the stream is regulated in accordance with the heating effect produced therein; substantially as described.

4. A heat reclaiming system for pulp mills, comprising one or more digesters provided with means for relieving gases therefrom during the digestion, means for bringing a small regulable stream of liquid into heat interchanging relation with such gases while still at a high temperature, whereby the liquid is heated to a high temperature by the waste heat contained in such gases, automatic means for regulating such stream of liquid in accordance with the heat imparted thereto, and a heating system arranged to receive and utilize the highly heated liquid thus produced; substantially as described.

In testimony whereof I affix my signature.

GEORGE S. WITHAM, Jr.